Patented Feb. 14, 1939

2,146,734

UNITED STATES PATENT OFFICE 2,146,734

EXTRUSION OF CAMPHOR AND PRODUCT THEREOF

Ivan Gubelmann, Wilmington, Del., and William S. Calcott, Woodstown, N. J., assignors to E. I. du Pont de Nemours & Company, Wilmington, Del., a corporation of Delaware No Drawing. Application December 8, 1936, Serial No. 114,862

3 Claims. (Cl. 18—48)

This invention relates to shaped solid camphor, more particularly it relates to shaped camphor having an indeterminate length and a small cross section, still more particularly it relates to camphor in the form of rods, bars, tubes, ribbons, sheets, etc., of small cross section, and still more particularly it refers to a process which comprises forcing camphor through a restricted opening.

This invention has for an object the production of new shaped forms of camphor. A further object is the preparation of solid camphor in shaped forms which have commercial utility. A still further object is the production of solid camphor in shaped forms of small cross section and indeterminate length in commercial quantities, and in general an advancement of the art. Other objects will appear hereinafter.

These objects are accomplished by the following invention which comprises forcing camphor in a plastic state through a restricted opening. This may be done in several ways utilizing the conventional die extrusion apparatus and technic for plastic materials after the camphor is converted into a suitable state. The extrusion of the camphor may be carried out in the absence of free oxygen.

Thus, the objects may be accomplished by continually feeding liquid camphor into an apparatus which is capable of gradually cooling the material and, at the same time, forcing it through a restricted opening. It is essential that the camphor be in a plastic state while and preferably before it passes through the opening. The temperature, for example, may range from about 50° C. to about 170° C., and preferably from 70 C. to 150° C.

The objects may be accomplished also by gradually heating solid camphor until it becomes plastic, that is by heating until a temperature of between about 50° C. and about 170° C., and preferably about 70° C. to about 150 C., is reached.

The invention will be further illustrated, but is not intended to be limited by the following examples.

Example I

Liquid camphor having a melting range of 175° C. to 177° C. is fed continually into a machine in which it is gradually cooled and at the same time pushed forward, forcing this camphor which is in the plastic state through a restricted opening measuring ½" in diameter. As the plastic camphor reaches the restricted opening, its temperature ranges from 70°–170° C. The material is forced through the opening in a rod form and may have an indeterminate length. It is translucent. If instead of a round die, the opening is in the form of a rectangle, the solid camphor is secured in the form of a ribbon or a strip.

Example II

Liquid camphor having a melting range of 160°–164° C. is placed in a 2" x 15" cylinder. It is allowed to cool to 140° C., after which it is forced through an opening ⅜" in diameter. Camphor in rod form is secured.

Example III

Solid camphor having a melting range of 160°–165° C. is placed in a 2" x 15" cylinder. The cylinder is heated to 150° C. for a period of four hours. The camphor is then forced through an opening ⅜" in diameter. Camphor in rod form is secured.

In the preferred embodiment of the present invention, liquid camphor is continually cooled to a plastic state and when that state is attained it is continuously forced through a restricted opening.

It is possible to start with crystalline camphor and heat it to the temperature required for converting it into a plastic state. The temperature and time of heating are determined by the quality of camphor and the type of equipment used. Camphor having a melting range of 174°–177° C. becomes plastic when heated from 50 to a temperature below its melting point. Application of forces which cause the camphor to flow facilitates the development of plasticity.

The terms "plastic" and "plastic state" are intended to connote that the camphor is in a homogeneous condition and can be bent or molded into shapes without disturbing its transparency. Camphor in a non-plastic state crumbles readily, is granular or pulverant, or it may be crystalline. The plastic state can be obtained by a carefully controlled regulation of temperature. The temperature required depends upon the quality of the camphor started with as well as its physical state (viz., liquid, solid, crystalline). The temperature may range from slightly below its melting point to about 50° C. In the case of liquid camphor of a melting point between 175°–177° C., a temperature between 70°–170° C. gives excellent results and a temperature between 70°–150° C. Camphor having a lower melting range (for example, 160°–164° C.) is extruded at a temperature between 50° and 150° C., and preferably at about 140° C.

Pressures between about 50 to about 7000 pounds per square inch and higher, and preferably between 50 and 500 pounds per square inch, may be used.

Since camphor is a poor conductor of heat, the type of the machine used plays an important part in the required temperature. An ordinary screw-type press or extruding machine may be used quite satisfactorily. The screw may be one of many types, such as a variable pitch screw or a tapered screw, and may be jacketed with water, steam or oil, or other media for better temperature control.

Cold crystalline camphor can be forced through a restricted opening provided excessive pressure is used. The pressure required is about 8000 pounds per square inch. As soon as the camphor leaves the opening, it tends to split in different directions.

When camphor in a plastic state is forced through a restricted opening, the pressure required is much less and the material is translucent. Shaped products of indeterminate length may be obtained.

This invention has the advantage that camphor may be easily prepared in a commercially desirable form which is transparent to opaque.

It will be apparent to those skilled in the art that many different embodiments of the invention may be made without departing from the spirit and scope thereof. It is to be understood that we do not limit ourselves to the specific embodiments thereof except as defined in the appended claims.

We claim:

1. The process for producing transparent camphor which comprises cooling hot liquid camphor until it reaches a plastic state and continuously extruding the camphor while it is in a plastic state through a restricted opening.

2. The process for producing transparent camphor which comprises cooling hot liquid camphor until it reaches a plastic state and continuously extruding the same while it is in a plastic state and at a temperature from about 50° C. to a temperature slightly below its melting point through a restricted opening to form a strip of camphor.

3. The process for producing transparent camphor which comprises cooling hot liquid camphor until it reaches a plastic state and continuously extruding the camphor while it is in a plastic state and at a temperature from about 50° C. to a temperature slightly below its melting point and under a pressure between about 50 and about 500 pounds per square inch throughout a restricted opening.

IVAN GUBELMANN.
WILLIAM S. CALCOTT.